(12) United States Patent
Fiebig et al.

(10) Patent No.: US 8,117,191 B2
(45) Date of Patent: Feb. 14, 2012

(54) XML DATABASE MANAGEMENT SYSTEM FOR AN XML DATABASE COMPRISING ACCESS-PROTECTED XML DATA

(75) Inventors: Thorsten Fiebig, Mannheim (DE); Heiko Weber, Pfungstadt (DE); Jürgen Harbarth, Taunusstein (DE)

(73) Assignee: Software AG, Darmstadt (DE)

( * ) Notice: Subject to any disclaimer, the term of this patent is extended or adjusted under 35 U.S.C. 154(b) by 105 days.

(21) Appl. No.: 12/461,965

(22) Filed: Aug. 28, 2009

(65) Prior Publication Data

US 2010/0250519 A1 Sep. 30, 2010

(30) Foreign Application Priority Data

Mar. 24, 2009 (EP) .................................... 09156076

(51) Int. Cl.
*G06F 17/30* (2006.01)
(52) U.S. Cl. ............. 707/718; 707/713; 706/12; 706/46
(58) Field of Classification Search .................. None
See application file for complete search history.

(56) References Cited

U.S. PATENT DOCUMENTS

| | | | | |
|---|---|---|---|---|
| 7,672,946 | B2* | 3/2010 | Kudo et al. | 707/783 |
| 7,865,502 | B2* | 1/2011 | Balmin et al. | 707/713 |
| 7,913,172 | B2* | 3/2011 | Rjaibi et al. | 715/741 |
| 7,913,241 | B2* | 3/2011 | Liu et al. | 717/151 |
| 2004/0193607 | A1* | 9/2004 | Kudo et al. | 707/9 |
| 2005/0076030 | A1* | 4/2005 | Hada et al. | 707/9 |
| 2005/0240624 | A1* | 10/2005 | Ge et al. | 707/104.1 |
| 2006/0143557 | A1 | 6/2006 | Chan et al. | |
| 2008/0263008 | A1* | 10/2008 | Beyer et al. | 707/3 |

OTHER PUBLICATIONS

Deutsch et al, "The NEXT Framework for Logical XQuery Optimization", Proceedings of the 30th VLDB Conference, 2004.*
Fisher et al, "Algebraic Transformation and Optimization of XQuery", Springer-Verlag Berlin Heidelberg, 2004.*
Groppe et al, "Schema-based query optimization for XQuery queries", University of Paderborn, Germany,2005.*
Groppe et al, "Shifting Predicates to Inner Sub-Expressions for XQuery Optimization", SITIS, 2006.*
"XML Access Control Using Static Analysis"; Murata et al., ACM Transactions on Information and System Security, vol. 9, No. 3, Aug. 2006, pp. 292-324.
"Security-Conscious XML Indexing", Xiao et al.; Advances in Databases: Concepts, Systems and Applications; (Lecture notes in Computer Science) Springer Berlin 2007, vol. 4443; pp. 949-954.

* cited by examiner

*Primary Examiner* — Hung Le
(74) *Attorney, Agent, or Firm* — Nixon & Vanderhye PC (57) ABSTRACT

The present invention concerns an XML data base management system (XDBMS, 10) for an XML database (20) comprising XML documents (30), each XML document (30) comprising one or more structural elements (35) and adhering to an XML schema (40), wherein at least one of the structural elements (35) is protected against access of a user (60), the XDBMS (10) comprising:

a. an optimizer (300) adapted to process an XQuery (50) of the user (60) comprising one or more XQuery expressions (55) and further adapted to generate an optimized XQuery execution plan (70);

b. an execution engine (400) adapted to execute the optimized XQuery execution plan (70) to retrieve XML data (80) from the XML database (20), characterized in that c. the optimizer (300) is adapted to generate the optimized XQuery execution plan (70), so that all XQuery expressions (55) relating to one or more of the structural elements (35) which are protected against access of the user (60) are ignored by the optimizer (300).

24 Claims, 6 Drawing Sheets

```
<?xml version = "1.0" encoding = "UTF-8"?>
  <xs:element name = "employee">
    <xs:complexType>
      <xs:sequence>
        <xs:element name= " date-of-birth " type = "xs:date"/>
        <xs:element ref = "name"/>
        <xs:element name = "salary" type = "xs:integer"/>
        <xs:element name = "manager" type = "xs:integer"/>
      </xs:sequence>
      <xs:attribute name = "number" type = "xs:integer"
          use = "required"/>
    </xs:complexType>
  </xs:element>
  <xs:element name = "name">
    <xs:complexType>
      <xs:sequence>
        <xs:element name = "last" type = "xs:string"/>
        <xs:element  name = "first" type = "xs:string"/>
      </xs:sequence>
    </xs:complexType>
  </xs:element>
</xs:schema>
```

45 → (pointing to salary element)
40 (bracket encompassing schema)

Fig. 5b

```
<employee number="12345">
  <date-of-birth>1979-11-14</date-of-birth>
  <name>
    <last>Gibbons</last>
    <first>Peter</first>
  </name>
  <salary>56000</salary>
  <manager>67890</manager>
</employee>

<employee number="67890">
  <date-of-birth>1949-12-01</date-of-birth>
  <name>
    <last>Lumbergh</last>
    <first>Bill</first>
  </name>
  <salary>125000</salary>
  <manager>11111</manager>
</employee>
```

30 (bracket for first employee)
30 (bracket for second employee)
35 (pointing to salary elements)

Fig. 6a

```
<acl name="default"
     xmlns="http://namespaces.softwareag.com/tamino/response2">
  <ace>
    <subject>hr/employee/salary</subject>
    <deny><privilege><all/></privilege></deny>
  </ace>
  <ace>
    <subject>hr/employee</subject>
    <grant><privilege><read/></privilege></grant>
  </ace>
</acl>
```

90 { (first ace block)
90 { (second ace block)
35

Fig. 6b

```
<acl name="hracl"
     xmlns="http://namespaces.softwareag.com/tamino/response2">
  <ace>
    <subject>hr/employee</subject>
    <grant><privilege><all/></privilege></grant>
  </ace>
</acl>
```

90 { (ace block)
35

Fig. 7a

```
<acl xmlns="DAV:">
  <ace>
    <principal><href>/ino:group/hrgroup</href></principal>
    <grant><privilege><all/></privilege></grant>
  </ace>
  <ace>
    <principal><all/></principal>
    <deny><privilege><all/></privilege></deny>
  </ace>
</acl>
```

65
95 { (first ace block)
95 { (second ace block)

Fig. 7b

```
<group name="hrgroup"
     xmlns ="http://namespaces.softwareag.com/tamino/response2">
  <userref>A</userref>
  <userref>B</userref>
  <aclref>hracl</aclref>
</group>
```

65 { (group block)

Fig. 8

```
Select [$y > 10000]  •―― 740
         ↑
Path [$y: $x/salary]  •―― 730
         ↑
Path [$x: $d/employee]  •―― 720
         ↑
DoctypeScan [$d: "employee"]  •―― 710
```

Fig. 9

XML DATABASE MANAGEMENT SYSTEM FOR AN XML DATABASE COMPRISING ACCESS-PROTECTED XML DATA

This application claims priority to European Patent Application No. 09156076.3 filed 24 Mar. 2009, the entire contents of which is hereby incorporated by reference.

1. TECHNICAL FIELD

The present invention relates to an XML database management system for an XML database comprising access-protected XML data.

2. THE PRIOR ART

Data in the Extensible Markup Language (XML) format is of growing importance in modern applications like those following the Service Oriented Architecture (SOA) paradigm. In order to efficiently store and retrieve such XML data, XML database management systems (XDBMS) are a central component in modern IT infrastructures. An XDBMS is to be understood as a system comprising hardware and/or software adapted to facilitate the access to XML data such as XML documents or individual XML elements of XML documents stored in an XML database. Since modern applications are often distributed over a plurality of hardware such as servers governed by different parties, wherein the distributed parts of an application communicate over networks like LANs or the Internet, security—and especially access control—becomes a critical issue. Access control generally refers to the protection of highly confidential data against unauthorized access by a user, wherein a user may be a human user, another application, a web service or the like. As a result, protecting XML data via access control is an important necessity in XDBMSs in order to ensure the security and the confidentiality of the data.

XML data is generally of hierarchical structure, i.e. any XML element in a piece of XML data may comprise any number of further XML elements itself, forming a tree-like structure. Furthermore, XML data may comprise any number of XML attributes, XML processing instructions, XML comments or any other kind of structural elements defined by the XML standard. In the following, the term "structural element" may refer to any of the above-described contents of XML data. The general syntax of XML is defined in "*Extensible Markup Language (XML) 1.0 (Fifth Edition)*" of the World Wide Web Consortium (W3C Recommendation, Nov. 26, 2008, URL http://www.w3.org/TR/xml/). Furthermore, XML data is typically stored in XML databases in a plurality of XML documents with equal structure but different content, wherein each XML document represents a data record in the XML database. XML documents may also be referred to as XML instances. Typically, the structure of XML documents is defined in an XML schema. The XML schema language is an XML dialect defined in "*XML Schema Part 0: Primer Second Edition*" of the World Wide Web Consortium (W3C Recommendation, Oct. 28, 2004, URL http://www.w3.org/TR/xmlschema-0/) for more information).

Taking into account the specific manner in which XML data is organized, modern XDBMSs like the Tamino XML Server of applicant follow two major approaches for access-protecting confidential data. Firstly, structure-based access-control refers to the protection of certain structures in XML data, i.e. avoiding that unauthorized users access one or more elements of the XML documents stored in an XML database which comprise confidential data. Secondly, instance-based access-control refers to the avoiding of unauthorized users accessing individual confidential XML documents, i.e. data records, in the XML database. These two approaches are further explained in the detailed description below.

Besides access-control, another key feature of an XDMBS is an interface for querying XML data, i.e. a way for users to retrieve XML data stored in an XML database. In the field of XML, the declarative XML query language (XQuery) has become the most commonly used query language. XQuery is specified in "*XQuery 1.0: An XML Query Language*" of the World Wide Web Consortium (W3C Recommendation, Jan. 23, 2007, URL (http://www.w3.org/TR/xquery/). One particular goal of any query processing approach is the increasing of the efficiency, i.e. the provision of query results as fast as possible and with the least efforts in terms of computation power.

Figure 1:
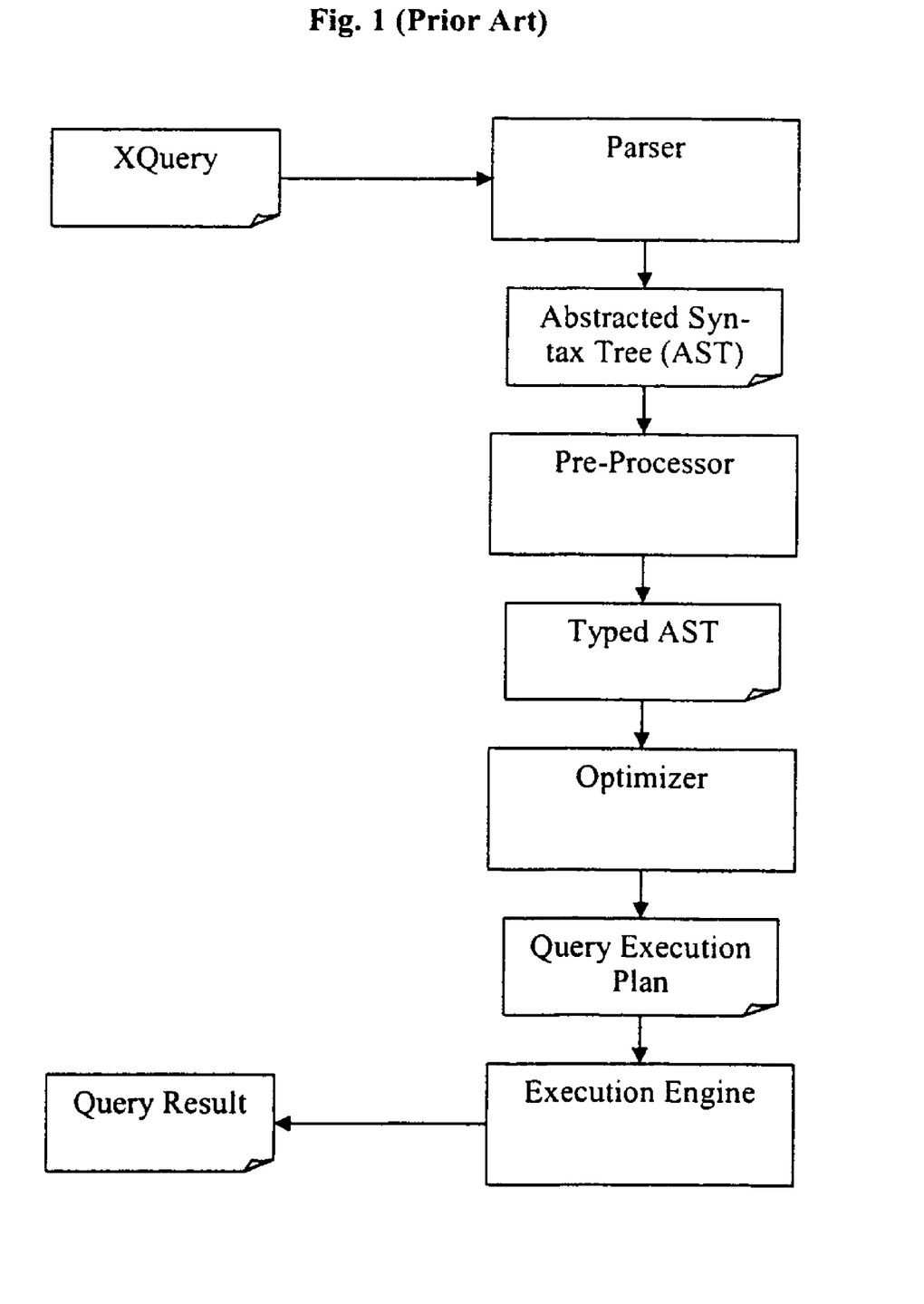
FIG. 1: A schematic overview of the control flow for XQuery processing according to the prior art.

The processing of an XQuery in order to retrieve the desired data generally follows the four phases labeled Parser, Pre-Processor, Optimizer and Execution Engine depicted in FIG. 1. These four phases are typically performed by components of a database system called parser, pre-processor, optimizer and execution engine, respectively, which may be collectively referred to as query processor. As can be seen, an incoming XQuery is first parsed, i.e. the logical units of the incoming XQuery are extracted in order to produce an Abstracted Syntax Tree (AST). The AST is then pre-processed, which comprises typing the AST, i.e. each expression in the AST is assigned a data type in order to produce a Typed AST. The Typed AST is then optimized in order to produce a Query Execution Plan. The optimization may comprise static optimizations such as determining which indexes can be used to evaluate the XQuery in a more efficient manner and rewriting the Typed AST accordingly. The aforementioned phases, which may further comprise a semantic analysis of the XQuery, are collectively referred to as compilation. Subsequently, the produced Query Execution Plan is executed to retrieve the final query result.

Various approaches are known from the prior art for increasing the efficiency of the above-described query processing relating to XML data in general, e.g. from the EP 1 986 108 A1 of Applicant. However, when querying access protected XML data, these approaches are not well suited, since access control increases the complexity of the query processing to a great extent and thus often results in an insufficient optimization of the XQuery, leading to unacceptable performance of the overall XQuery processing.

In a different context, namely for relational databases rather than XML databases, the US 2007/0276835 A1 discloses a technique for efficient access control. It discloses rewriting queries directed to data in access protected rows or tables of a relational database, so that the rewritten queries can be more efficiently processed. However, the data model underlying relational databases follows a strictly linear storage paradigm comprising flat tables with rows and columns as the main data structures. Since this storage model is fundamentally different from the aforementioned hierarchical XML data model, the optimization approaches known from relational databases cannot be used in XML databases.

It is therefore the technical problem underlying the present invention to provide an XML database management system which facilitates the retrieval of access protected XML data from an XML database, which enforces the security of the access protected XML data and at the same time considerably increases the efficiency of the query processing, thereby at least partly overcoming the above explained disadvantages of the prior art.

3. SUMMARY OF THE INVENTION

This problem is according to one aspect of the invention solved by an XML data base management system (XDBMS) for an XML database comprising XML documents, each XML document comprising one or more structural elements and adhering to an XML schema, wherein at least one of the structural elements is protected against access of a user. In the embodiment of claim 1, the XDBMS comprises:
a. an optimizer adapted to process an XQuery of a user comprising one or more XQuery expressions and further adapted to generate an optimized XQuery execution plan;
b. an execution engine adapted to execute the optimized XQuery execution plan to retrieve XML data from the XML database, wherein
c. the optimizer is adapted to generate the optimized XQuery execution plan, so that all XQuery expressions relating to one or more of the structural elements which are protected against access of the user are ignored by the optimizer.

Accordingly, the embodiment defines an XDBMS that considerably increases the efficiency of XML data retrieval from a database comprising XML data following the structure-based access-control described in the introductory part above. To this end, at least one of the structural elements of XML documents stored in an XML database is protected against access of a user. As already described above, a structural element in this context may be an XML element, an XML attribute or any other structural entity of XML data defined by the XML standard. An XQuery initiated by the user generally comprises one or more XQuery expressions, wherein each XQuery expression is adapted for retrieving certain structural elements from the XML database. An exemplary XQuery is described in the detailed description below.

The optimizer provided by the XDBMS is adapted to first generate an optimized XQuery execution plan from the XQuery. Subsequently, the execution engine provided by the XDBMS executes the optimized XQuery execution plan generated by the optimizer. As a result, the execution engine produces a query result comprising the XML data that the user intends to retrieve by means of the XQuery. So far, the XDBMS according to the present invention generally follows the common approach to XML query processing depicted in FIG. 1.

However, the optimizer of the XDBMS is specifically adapted for increasing the efficiency of the processing of the XQuery with respect to the XML data protected against access of the user. To this end, the optimizer is adapted to generate the optimized XQuery execution plan in such a manner that all XQuery expressions of the XQuery that relate to structural elements which are protected against access of the user are ignored by the optimizer. This approach has three major advantages:

Firstly, the number of processing steps and consequently the processing time of the optimizer is considerably decreased, since all XQuery expressions which relate to access protected structural elements are ignored during the optimization performed by the optimizer. In other words, the optimizer focuses on optimizing only the XQuery expressions which relate to structural elements accessible to the user, so that the overall optimization process takes considerably less time as compared to the approaches known from the prior art.

Secondly, since the XQuery execution plan produced by the optimizer is already specifically optimized for the XML data to be retrieved, the subsequent processing of the execution engine also takes far less time and processing power, as compared to the common approaches known from the prior art. These two aspects are further demonstrated by an example in the detailed description below.

Thirdly, it should be appreciated that the overall security of the XQuery processing is not affected or reduced at all, so that the present invention advantageously combines the two objectives of a reliable enforcement of high security standards and a very efficient XQuery processing.

According to another aspect of the present invention, the XDBMS is further adapted to determine one or more groups the user belongs to and at least one of the structural elements is protected against access of the one or more groups. Accordingly, a user may belong to one or more groups, wherein a group may itself belong to one or more further groups, thus building a complex group hierarchy. A group may be an internal group, i.e. a group defined within the XDBMS, or an external group, i.e. a group defined e.g. in an external user repository such as an LDAP repository.

The determination of the groups to which the user (or a group) belongs, i.e. the resolving of the group hierarchy, is preferably performed as one of the first steps of the query compilation by the query processor to ensure the efficiency of the access control related checks. To this end, the query processor may first determine the one or more groups the user directly belongs to. For each of the determined groups, the query processor may then recursively determine if these groups themselves belong to further groups.

Furthermore, since the group hierarchy may be arbitrary complex, the result of the above described group resolving may be cached in order to improve the overall performance. To this end, the information about which user belongs to which groups may be temporally stored in a user/group cache. If the group hierarchy needs to be resolved again at a later stage, this user/group cache may be inspected instead of performing the complete group resolving anew. In order to keep the user/group index up-to-date, the group resolving may be performed on a regular basis according to a parameter set by an administrator.

In a further aspect, the XDBMS further comprises a pre-processor adapted to evaluate at least one structure-based access privilege to determine the XQuery expressions to be ignored by the optimizer, the at least one structure-based access privilege protecting access to the respective structural element for the user and/or the groups. Evaluation of an access privilege in this context means checking the contents of the access privilege, so that a conclusion can be drawn whether the access privilege grants or denies a certain action to a principal (a user and/or group). The concept of access privileges is explained in more detail in the detailed description below. Accordingly, in contrast to the prior art, the evaluation of the structure-based access privileges is not performed during the query execution by the execution engine, but already by the pre-processor provided by the XDBMS, i.e. far earlier in the XQuery processing process. In particular, the evaluation of the structure-based access privileges is performed before the optimizer starts its processing, so that the optimizer performs its optimization tasks on an already "filtered" set of XML expressions of the XQuery.

Furthermore, the pre-processor may be further adapted to derive the at least one structure-based access privileges from type information defined in the XML schema. This has the further advantage that the structure-based access privileges may be stored in a central location, i.e. within the XML schema. Alternatively, the access privileges may also be stored in a distributed manner and may be referenced by the XML schema. However, in both cases, the structure-based access privileges may be defined only once and then apply to all respective XML elements of all XML documents adhering to the XML schema, which considerably reduces the effort when creating and later updating the structure-based access privileges. Since the structure-based access privileges can be derived from the type information defined in the XML schema, the evaluation of the structure-based access privileges may be performed already during the typing process, i.e. during generating the Typed AST (cf. FIG. 1).

Moreover, the at least one structure-based access privilege may be attached to the XML documents comprising the respective structural element and the execution engine may be further adapted to evaluate the at least one structure-based access privilege. As explained in the preceding paragraph, during the typing process, the type information determined for the XQuery expressions relating to certain structural elements is typically defined by an XML schema. However, as will be further explained in the detailed description below, it might not be possible to statically type certain XQuery expressions, since no corresponding typing information may be present in the XML schema. Instead, the type information may be unknown at the time of query typing. Typically, the corresponding structural elements reference in this case their type information from inside the XML document the structural element is comprised in, instead of from the XML schema. Accordingly, the structure-based access privileges relating to these structural elements may be attached to the XML documents themselves. The execution engine can then evaluate these structure-based access privileges when retrieving the individual XML documents from the XML database during query execution.

In this case, the execution engine may be further adapted to scan a structure index as e.g. known from the US 2005/0131895 A1 of Applicant. A structure index generally serves to store aggregated structure information, i.e. it may be used to determine which structural elements are currently present within the XML documents stored in an XDBMS at any given time, and which structural elements do not occur within the XML documents currently stored in the XDBMS. Thus, consulting a structure index is especially advantageous if certain XQuery expressions cannot be typed statically, as described above.

According to yet another aspect of the present invention, the execution engine is further adapted to evaluate one or more instance-based access privileges attached to at least one of the XML documents, the instance-based access privileges protecting access for the user and/or the groups to the respective XML documents. Accordingly the instance-based access privileges are not related to individual structural elements (like the structure-based access privileges), but rather to complete XML documents, thus following the instance-based access-control approach described in the introductory part above. Examples for the evaluation of the instance-based access privileges can be found in the detailed description below.

Furthermore, the XDBMS may be adapted to generate an access privilege index from the structure-based and/or instance-based access privileges and the execution engine may be adapted to scan the access privilege index. Accordingly, the efficiency of the evaluation of structure-based and/or instance-based access control is considerably increased due to the use of the access privilege index. As it will be appreciated by those skilled in the art, scanning an index requires less processing time than consulting the various structure-based and/or instance-based access privileges individually and is thus far more efficient.

The access privilege index may comprise one or more index entries each comprising a reference to a user and/or group, a reference to an XML document, an access privilege and/or an identifier. Furthermore, the execution engine may be adapted to evaluate the first index entry of the access privilege index that matches the user and/or the groups according to an order defined by the identifiers of the index entries. Examples of the access privilege index and its advantageous use are shown in the detailed description below.

Generally, the structure-based and/or instance-based access privileges may be defined by Access Control Lists (ACLs).

The present invention further relates to a computer program comprising instructions for implementing any of the above-presented XML database management systems.

Furthermore, the present invention concerns a method for processing an XQuery of a user to retrieve XML data from an XML database using any of the above-presented XML database management systems. Lastly, a computer program is provided comprising instructions for implementing the above-presented method.

4. SHORT DESCRIPTION OF THE DRAWINGS

In the following detailed description, presently preferred embodiments of the invention are further described with reference to the following figures:

FIG. 5b: Two exemplary XML documents adhering to the XML schema of FIG. 5a;

5. DETAILED DESCRIPTION

As already described in the introductory part, querying access control protected XML data is an important feature of modern XML database management systems (XDBMS) to support applications following the Service Oriented Application (SOA) paradigm. The present invention provides an XDBMS 10 (cf. FIG. 2) adapted for efficient XQuery 50 processing on access control protected XML data such as XML documents 30 or individual XML elements 35 of XML documents 30 stored in an XML database 20, which facilitates both structure-based and instance-based access control.

Following a common model for XQuery processing, structure-based access control may be evaluated during the semantic analysis of an XQuery 50. For instance-based access control, XML documents 30 stored in the XML database 20 may be annotated with access control lists (ACLs). To evaluate the ACLs during query execution, the XDBMS 10 of the present invention generates extended XQuery execution plans 70. The extended XQuery execution plans 70 are stated in terms of an extended XQuery processing algebra that provides access control-related operators. The present invention thereby facilitates the optimization of the extended XQuery execution plans 70 by applying algebraic query optimization. Furthermore, the present invention provides the concept of an ACL index for the efficient access of ACL information.

Access Control in XML Databases

The protection of XML data in XML databases differs significantly from security concepts known from relational database systems, since the XML data model, i.e. the manner in which XML data is organized, completely differs from the relational data model (cf. the introductory part above). In products like the Tamino XML Server of Applicant, structure-based as well as instance-based access control can be employed, which will be described in more detail below.

Figure 5A:
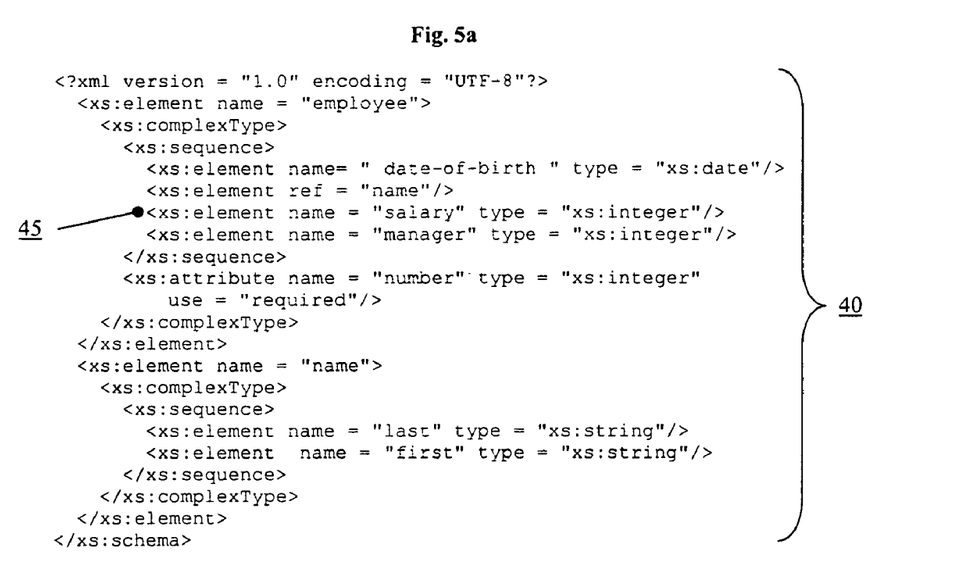
FIG. 5a: An exemplary XML schema according to embodiments of the present invention.

Structure-based access control means that XML data is protected by defining access privileges for certain structural elements, such as XML elements, XML attributes or any other structural entities of XML data defined by the XML standard. The structural elements are typically defined by XML schemas. In the XDBMS 10 of the present invention, one or more XML schemas 40 are specified in the XML schema language, mentioned in the introductory part above. FIG. 5a depicts an exemplary XML schema 40 that defines the structure of employee XML elements 35 for storing employee-related data (XML documents 30) in the XML database 20. As can be seen in FIG. 5a, an employee XML element 35 is defined to comprise child XML elements 35 date-of-birth, name, salary, and manager. Furthermore, date-of-birth XML elements 35 are defined as being of type xs:date and salary and manager XML elements 35 are defined as being of type xs:integer, as indicated by the respective type information 45 of the XML schema 40. The name XML element 35 itself is defined by two child XML elements 35, namely a last XML element 35 and a first XML element 35 of type xs:string, which highlights the hierarchical structure of XML. Moreover, the exemplary XML schema 40 in FIG. 5a defines that employee XML elements 35 must comprise a required XML attribute number of type xs:integer. It should be appreciated that the XDBMS 10 according to the present invention may comprise more than one XML schema 40 for defining different types of XML documents for different purposes. Furthermore, the exemplary XML schema defining the structure of employee elements is only one of a wide variety of examples.

Figure 5B:
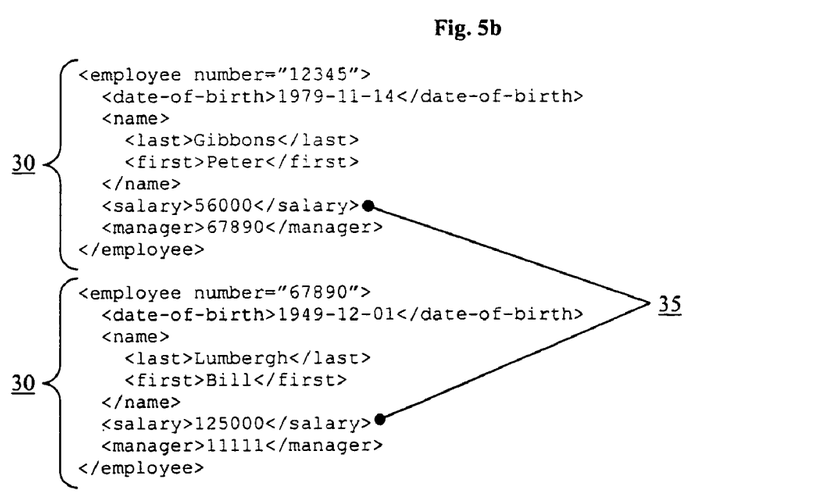

FIG. 5b shows two exemplary XML documents 30 representing instances of the above-presented XML schema 40. As can be seen, an XML document 30 adhering to the XML schema 40 has the exact structure defined by the XML schema 40, wherein the XML elements 35 of the XML document 30 are filled with concrete values that have to adhere to the types defined in the XML schema 40.

In the example of FIGS. 5a and 5b, certain XML elements 35 of the XML documents 30, such as name or date-of-birth, are assumed to be uncritical in terms of security and therefore should be accessible to any user of the XDBMS 10. In contrast, access to the XML element salary 35 of each XML document 30 must be restricted to only a limited set of users, since the salary XML element 35 stores confidential information (the yearly salary of an employee) and should be kept secret under any circumstances for the majority of XDBMS users. It should be appreciated that using structure-based access control, not only individual XML elements 35 can be protected, but also XML database containers such as collections as well as the execution of certain data retrieval functions. Furthermore, as already described above, any structural element of XML data may be protected, such as XML attributes, XML comments, etc.

Figure 6A:
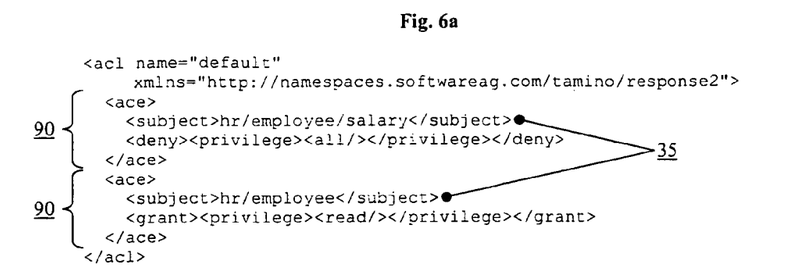
FIG. 6a, b: Exemplary structure-based access privileges for structure-based access control according to embodiments of the present invention.
Figure 6B:
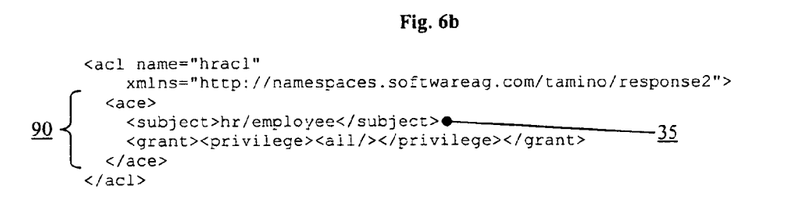

For specifying the level of access to an XML element 35 of an XML document 30, Access Control Lists (ACLs) can be used, an example of which is shown in FIG. 6a. The example ACL of FIG. 6a defines structure-based access privileges 90 on the collection hr holding employee elements, for example the XML documents 30. The ACL name "default" in this context indicates that the respective ACL should apply to all possible users, unless stated otherwise. To this end, the exemplary ACL in FIG. 6a grants read access to employee XML elements 35 but denies any access to salary XML elements 35, since the company wants to keep the individual salary as a secret. As the example shows, an ACL as it is defined in the Tamino XML Server of Applicant comprises any number of access privileges/Access Control Elements (ACEs). Each ACE 90 consists of an optional "subject" that defines the target XML element 35 and a "grant" or "deny" of a "privilege", such as "read", "update", "delete", "all" or any other suitable privilege. To become effective, the ACL needs to be assigned to an individual user and/or a group, wherein a group may reference one or more users or further groups, building an arbitrary complex group hierarchy (see above). As already mentioned, the exemplary ACL of FIG. 6a is implicitly assigned to the "default" group, which comprises all possible users, i.e all users of the XDBMS 10 inherit the access privileges 90 according to the given ACL of FIG. 6a. In order for a user to be allowed to access the salary XML element 35, the user needs to belong to a specially authorized group, such as the exemplary hrgroup group 65 defined in FIG. 7b. As can be seen, the group 65 lists the users of the group (user "A" and user "B" in the example) and references the hracl ACL, which defines the access privilege 90 granted to the hrgroup group 65. The corresponding hracl ACL is depicted in FIG. 6b. As can be seen in FIG. 6b, members of the hrgroup group 65 are granted all access privileges on employee XML elements 35.

The access privilege 90 defined in FIG. 6b highlights an aspect specific to the hierarchical structure of XML. Since users belonging to the hrgroup group 65 are allowed to access employee XML elements 35, these users are also allowed to access all child XML elements 35 of the employee XML element 35, such as the salary XML element 35. Thus, access privileges defined on XML elements may be "inherited" by all child XML elements according to the hierarchical structure of XML.

Figure 3:
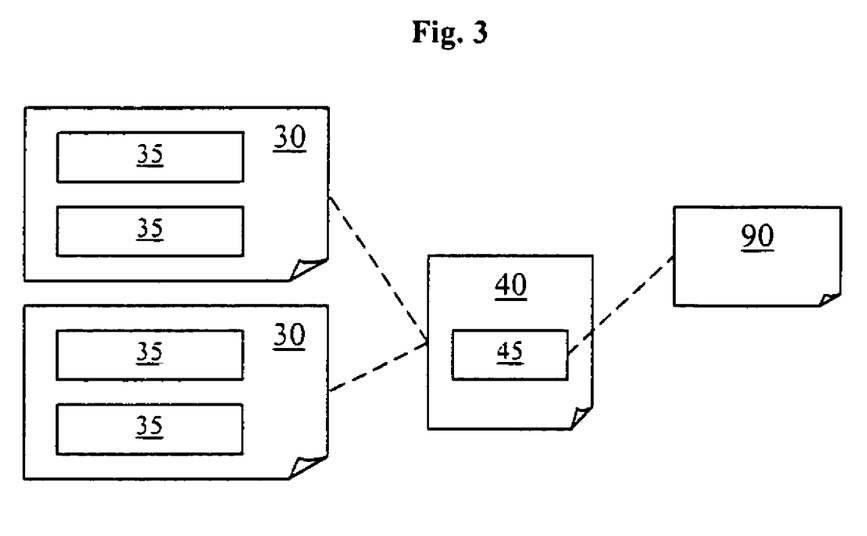
FIG. 3: A schematic overview of structure-based access control according to embodiments of the present invention.

As can be seen in FIG. 3, in order to define structure-based access control, the structure-based access privileges 90 are preferably referenced from the type information 45 of the XML schema 40.

Figure 4:
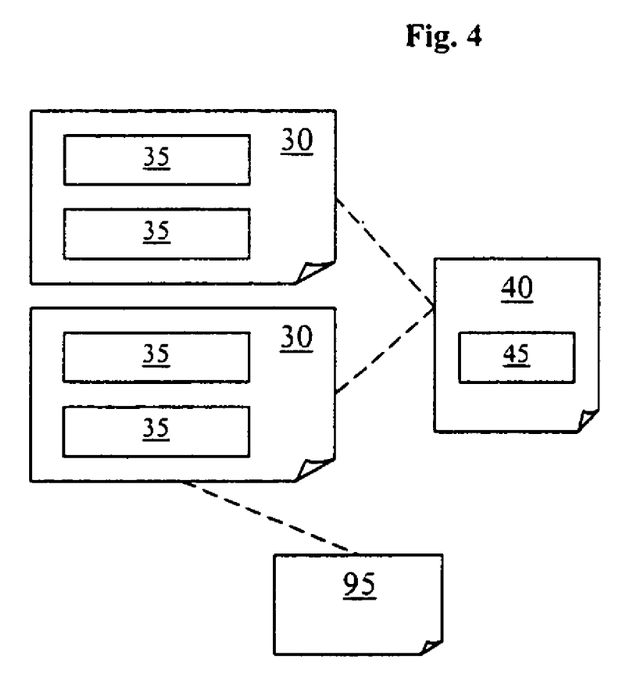
FIG. 4: A schematic overview of instance-based access control according to embodiments of the present invention.
Figure 7A:
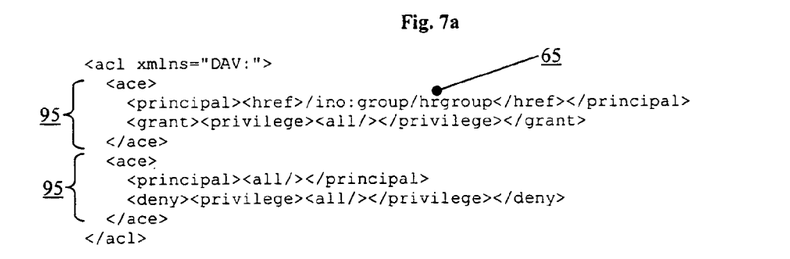
FIG. 7a: Exemplary instance-based access privileges for instance-based access control according to embodiments of the present invention.
Figure 7B:
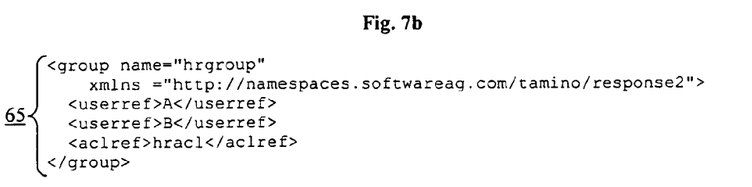
FIG. 7b: An exemplary group definition according to embodiments of the present invention.

Furthermore, ACLs may also be used to protect instances, i.e. individual XML documents 30, stored in an XML database according to instance-based access control. To this end, XML documents 30 stored in the XML database 20 are directly annotated with one or more ACLs comprising one or more instance-based access privileges 95 to define the operations that can be executed on the XML documents 30 by which user (cf. FIG. 4). The exemplary ACL depicted in FIG. 7a comprising two instance-based access privileges (ACEs) 95 grants full access to the members of the hrgroup. All other users do not have any access to the protected document (cf.

the "principal" elements and the "grant" and "deny" elements in FIG. 7a). As can be seen, the instance-based access privileges 95 of FIG. 7a do not reference individual structural elements 35 (as compared to the structure-based access privileges 90 described above), but rather the whole ACL depicted in FIG. 7a is referenced from the XML documents 30 to be protected by this ACL. As FIG. 7a further shows, ACLs do not need to be "conflict free". An ACL may comprise an ACE 90, 95 that permits a certain operation as well as an ACE 90, 95 that denies the same operation. This "conflict" is resolved via the order of the ACEs 90, 95 in the given ACL, i.e when determining a suitable ACE 90, 95, the first ACE that matches the given user is selected.

Querying Protected XML Data with XQuery

Since XQuery is the most commonly used language for querying XML data, an XQuery processor or an XDBMS 10, respectively, has to enforce the authorization approaches presented above. Consequently, when executing an XQuery 50 initiated by a user 60 (cf. FIG. 2), the authorization of the user 60 needs to be evaluated. XML data that must not be accessed by the querying user 60 has to become invisible for the user 60. Referring to the above-presented example, a user 60 not belonging to the hrgroup group 65 must not be allowed to retrieve any results for the following XQuery 50:

```
for $x in collection("hr") /employee
let $y := $x/salary
where $y > 100000
return $x
```

The above XQuery 50 determines all employees that have a salary above the given amount, i.e. 100,000 in the example. The first line of the XQuery 50 iterates over all XML documents 30 stored in the collection hr of the XML database 20. It extracts the comprised employee XML elements 35 by applying a path XML expression 55 and binds the extracted XML elements 35 to the variable $x. The second line binds the variable $y to the salary XML elements 35 comprised in the employee XML elements 35 that have been bound to variable $x. The for clause and the let clause each produce a tuple for each employee XML element 35. In the example, the generated tuples, also referred to as a tuple list, comprises two entries holding the bindings for variable $x and $y. The tuple list is then subsequently filtered by the where clause shown in the third line of the exemplary XQuery 50. Only those tuples pass the filter (the where clause) that have an element bound to $y that comprises a value greater than 100000. Finally, the XQuery 50 returns all tuples (see the fourth line of the XQuery 50) that remains bound to the variable $x after the above-described steps. Generally, each path expression such as hr/employee in the above example, each comparison of a variable with a value such as $y>100000 and each assignment of a variable with a value such as $y:=$x/salary constitutes an XQuery expression 55.

If the authorization is structure-based according to the ACLs of FIGS. 6a and 6b described above, the salary XML element 35 cannot be read by the user 60. Thus, the variable $y is assigned to an empty sequence. According to the XQuery specification, comparing an empty sequence yields the Boolean value false.

If the authorization is instance-based according to the ACLs of FIG. 7a described above, all XML documents 30 are invisible to the user 60 that is not a member of the hrgroup group 65.

Processing XQueries

As it will be appreciated by the skilled person, the evaluation of access control greatly increases the complexity of query processing and can lead to a significant performance decrease. In order to resolve the performance problems resulting from access control definitions, the evaluation of access control needs to be optimized during XQuery processing. The approach provided by the present invention is based on a common XQuery processing model which is schematically shown in FIG. 1 and explained in the following.

One step during XQuery processing is the typing of the XQuery expressions 55 of the XQuery 50. As XQuery is a strongly typed language, every XQuery expression 55 and sub-XQuery expression 55 is assigned a type, i.e. a certain data type of the result produced by the XQuery expression 55. In order to determine the type of a path XML expression 55 which is extracting XML data from XML documents 30 stored in the XML database 20, the XML schema 40 definitions are checked, i.e. the type of a path XML expression 55 is determined based on type information 45 stored in the XML schema 40 (cf. FIG. 5a and the explanations above).

Due to the potential complexity of XQuery expressions 55, not for every kind of XQuery expression 55, the type of the related XML elements 35 can be determined statically, i.e. during the compilation of the XQuery 50. These cases may be covered by dynamic type checking, wherein the XML elements 35 to which the XQuery expressions 55 relate, reference their type directly.

In XDBMSs 10 like the Tamino XML server of Applicant (cf. FIG. 2), the result of the query compilation is an XQuery execution plan 70 that specifies how the query result 80 can be obtained from the XML database 20. The XQuery execution plan 70 comprises operations that are provided by the query execution engine 400 of the XDBMS 10. These operations may comprise database access operations, filer operations as well as XQuery specific operations.

The optimization process performed by the optimizer 300 during XQuery compilation is supposed to find an optimal XQuery execution plan 70. To this end, a commonly known approach is to translate the given XQuery 50 into an algebraic expression (an "Abstracted Syntax Tree (AST)" and/or a "Typed AST" in FIG. 1) and performing the optimization via rewriting or transforming the algebraic expression, which finally results in an optimized XQuery execution plan 70. This approach is also referred to as algebraic query processing.

Algebraic query processing is based on an operator set that reflects the capabilities of the underlying execution engine 400. The operators consume and produce ordered tuple lists. Each tuple entry comprises a piece of XML data that has been e.g. read from an index, extracted from an XML document 30 or determined by applying an XQuery expression 55. These tuple entries are called variable bindings. The tuples lists exchanged by the operators are called table structures.

Figure 8:
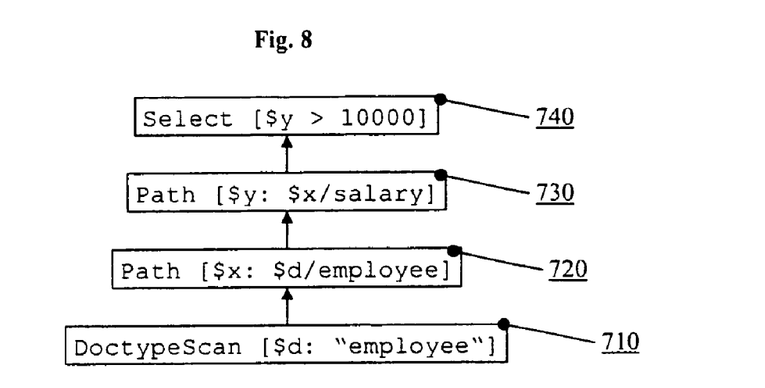
FIG. 8: A schematic overview of an exemplary XQuery Execution Plan according to embodiments of the present invention.

FIG. 8 shows an exemplary algebraic query expression that is the result of the transformation of the exemplary XQuery 50 presented above. FIG. 8 depicts an "operator tree", i.e. the operators 710, 720, 730, 740 of the algebraic expression are represented as nodes (cf. the boxes in FIG. 8). Each operator 710, 720, 730, 740 consumes the result of its input operator 710, 720, 730, 740 and produces a result that can be consumed by any other operator 710, 720, 730, 740. The directed edges of the operator tree (cf. the arrows in FIG. 8) visualize the data flow between the operators 710, 720, 730, 740. Operators that do not consume any input such as the operator 710 are called scan operators. Scan operators are responsible for reading XML documents 30 from disk (or any other storage means of the XML database 30) or accessing an index that has been defined on the XML documents 30 for efficient retrieval.

The exemplary operator tree of FIG. 8 comprises a DoctypeScan operator 710. In Tamino of Applicant, a database may comprise one or more collections, wherein a collection may comprise one or more doctypes. A doctype may group one or more XML documents each comprising the same root XML element (e.g. each XML document in the doctype employee comprises an XML element employee as the topmost (root) XML element). The DoctypeScan operator 710 scans all XML documents 30 that belong to the doctype employee and binds them to variable $d. In other words, the DoctypeScan operator 710 produces one tuple for each XML document 30 in the doctype employee, wherein each tuple comprises a single entry holding the complete XML document 30. The subsequent Path operator 720 extracts the employee XML elements 35 from the scanned XML documents 30 and binds them to the variable $x. Generally, the subscript (the portion of the operator between "[" and "]" in FIG. 8) of a Path operator 720, 730 comprises the output variable and a restricted XQuery path expression 55. A Path operator 720, 730 evaluates the path expression 55 for each tuple of the input table structure and binds the output variable to the resulting XML fragments, i.e. the part of the XML data selected by the path expression 55. The second Path operator 730 extracts the salary XML element 35 from each employee XML element 35. The result of the DoctypeScan 710 and the two Path operators 720, 730 is a table structure with the variables $d, $x and $y. This table structure is subsequently filtered by a Select operator 740 which applies the filter predicate of its subscript ("$y>100000" in FIG. 8) on each input tuple. In the example of FIG. 8, only those tuples pass the Select operator 740 that have a $y variable bound to a salary XML element 55 with a value greater than 100000. Generally, the filter predicate of a Select operator 740 may be an arbitrary complex Boolean XQuery expression.

The translated query (i.e. the algebraic query expression described above and shown in FIG. 8) is the input for the actual query optimization. An operator tree such as the operator tree depicted in FIG. 8 gives a descriptive visualization of an algebraic query expression. However, for describing the subsequent algebraic transformations, a more concise textual representation will be used. It should be appreciated that the notations of algebraic query expressions, operator trees and the following textual representation are equivalent. For the above-presented algebraic query expression, the textual representation is as follows:

```
Select [$y > 100000] (
    Path [$y: $b/salary] (
        Path [$x: $d/employee] (
            DoctypeScan [$d; "employee"] )))
```

A commonly known means for improving the efficiency of query processing are indices. Indices help to reduce the amount of XML data that needs to be read from the storage means of an XML database 30 in order to evaluate a query. It should be appreciated that reading data from a storage means such as a hard disk is extremely time consuming and should therefore be kept to a minimum. By algebraic rewriting, index access operators may be introduced into an algebraic query expression. Assuming an index on the salary XML elements 35, the exemplary XQuery 50 discussed above may be optimized by introducing an according index access operator. The resulting rewritten algebraic expression reads as follows:

```
Path [$x: $d/employee] (
    IdxScan [$d; /employee/salary;>;100000] )
```

Accordingly, the IdxScan retrieves the XML documents 30 comprising employees with a salary greater than 100000. This is especially advantageous, since only those XML documents 30 have to be read from the storage means of the XML database 20 that fulfill the given search predicate. In the context of huge XML databases with possibly Millions of XML documents 30 an index such as described above leads to a tremendous performance improvement.

Evaluation of Structure-based Access Control

Figure 2:
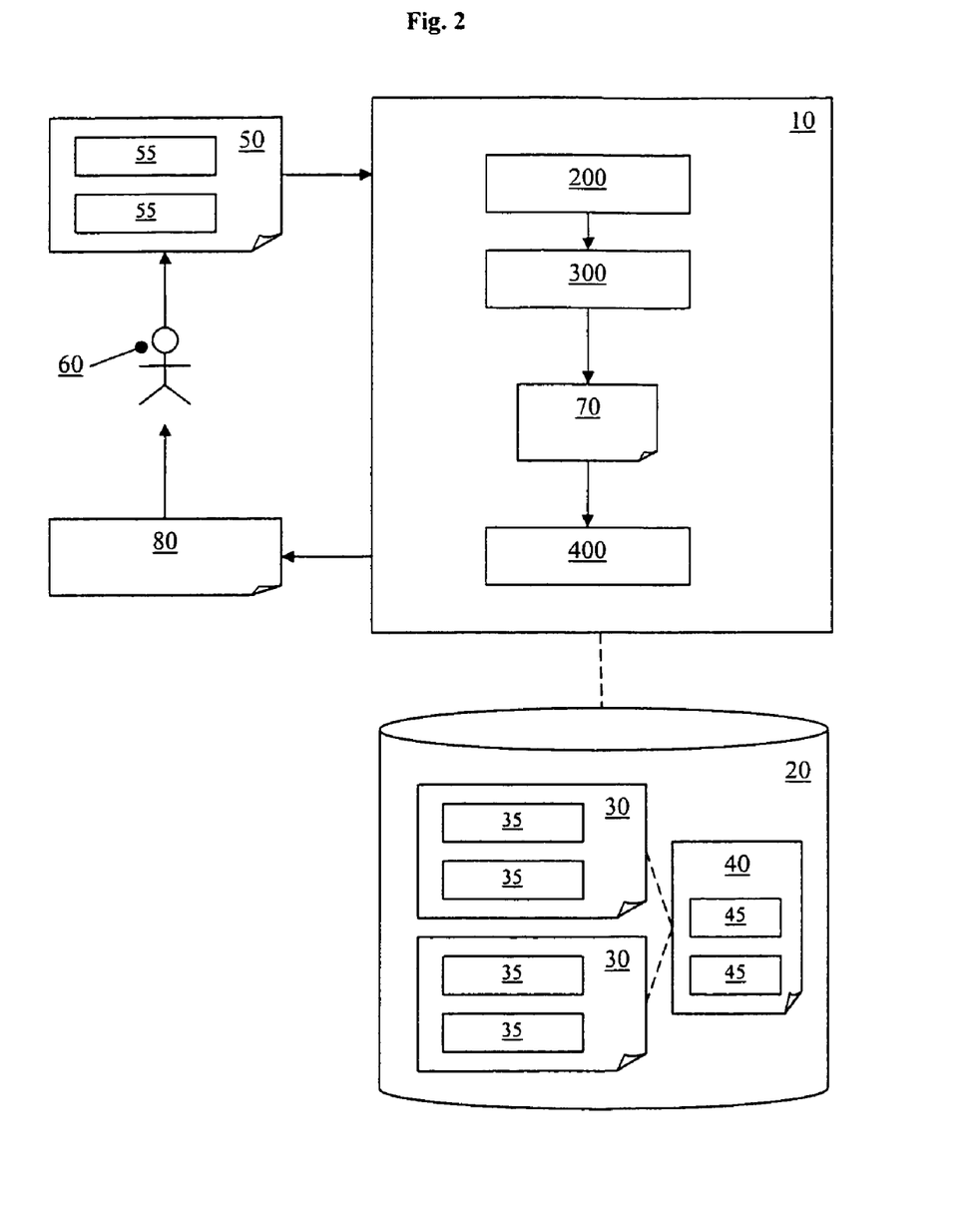
FIG. 2: A schematic overview of an embodiment of an XML database management system according to the present invention.

In the following, the evaluation of structure-based access control will be described as advantageously performed by the XDBMS 10 depicted in FIG. 2.

As already described above, structure-based access control is facilitated by annotating the XML schema 40 with access privileges 90 comprised in ACLs. Due to this, the evaluation of structure-based access control may be advantageously performed during the typing of the XQuery expressions 55 of the XQuery 50 performed by the pre-processor 200 of the XDBMS 10. During the type analysis, the type information 45 is retrieved from the XML schema 40 and each XQuery expression 55 is annotated with the type information 45 from the XML schema 40. Since the XML schema 40 is annotated with ACLs, the type information 45 assigned to an XQuery expression 55 references the ACL that needs to be evaluated. If the ACLs deny access for the user 60 who is stating the XQuery 50, the respective XQuery expression 55 is assumed to return an empty sequence. Since most of the typing can be typically performed statically during the semantic analysis phase, most of the evaluation of the structure-based access control can also be performed at that time, i.e. by the pre-processor 200 of the XDBMS 10. Evaluating the structure-based access control is a prerequisite for performing subsequent XQuery optimizations performed by the optimizer 300 of the XDBMS 10. When the optimizer 300 performs the optimization of the XQuery 50, all protected XQuery expressions 55, i.e. all XQuery expressions 55 relating to XML elements 35 protected against access of the user 60, are not considered by the query optimizer 300.

As already described above, for those XQuery expressions 55 that cannot be typed statically, the evaluation of the access control is performed during runtime, i.e. by the execution engine 400 of the XDBMS 10. Since in this case, the type information 45 is referenced directly from the XML documents 30 in contrast to being referenced from the XML schema 40, the respective ACLs can be determined from the references originating from the XML documents 30. To reduce the number of cases where dynamic access control checks are needed, a structure index can be used. A structure index may hold information about the structure, i.e. about the structural elements, of XML data (i.e. XML documents) currently stored in the XML database and may be used for the typing of an XQuery. To this end, a structure index may provide the information which structural elements are currently available in the XML database and which are not, so that the type of certain XQuery expressions can be determined more specifically.

Evaluation of Instance-based Access Control

Since in instance-based access control, the ACLs are referenced from the XML documents 30 themselves, instance-based access control may be enforced by investigating instances, i.e. XML documents 30, stored in the XML database 20, which is preferably performed during query execution, i.e. by the execution engine 400 of the XDBMS 10. To this end, the query execution plan 70 generated by the optimizer 300 is extended according to the present invention. Therefore, a checkPrivelege( ) function is provided that returns a Boolean value and is adapted to act as a filter predicate. Based on the exemplary XQuery described above, the extended XQuery execution plan 70 is as follows:

```
Path [$x: $d/employee] (
    Select[checkPrivilege($d,user,read)](
        IdxScan [$d; /employee/salary;>;100000] ))
```

The additional Select operator in the second line of the above listing uses the checkPrivilege( ) function to filter the XML documents 30 according to the level of authorization of the user 60. The above XQuery execution plan 70 has a high performance if the index scan IdxScan (cf. the third line in the listing above) returns a small number of XML documents 30.

On the other hand, in case the XML database 20 contains mainly highly paid employees and the user 60 that is stating the XQuery 50 can read only a limited amount of XML documents 30 the performance can be even further improved by applying a different XQuery execution plan 70. According to this different XQuery execution plan 70, the XML documents 30 which can be accessed by the user 60 are first retrieved via an according access privilege index 97, i.e. an ACL index 97 as shown in FIG. 9.

Figure 9:
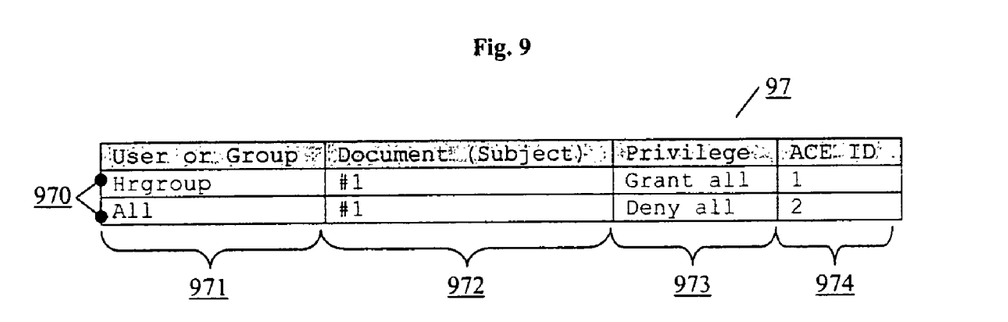
FIG. 9: A schematic overview of an exemplary access privilege index according to embodiments of the present invention.

The ACL index 97 shown in FIG. 9 is generated by the XDBMS 10 and is used to retrieve XML documents 30 via a given user ID of the user 60 as well as via the access operation (such as "read", "update", etc.). An index entry 970 of the ACL index 97 represents an ACE 90, 95. Each index entry 970 comprises a principal 970 (a reference onto a user and/or group) and privilege 973 with a flag that indicates if the privilege is granted or denied. In contrast to an ACL defined for instance-based access control (cf. FIG. 7a) which comprises one or more access privileges/ACEs 95, an index entry 970 of the ACL index 97 comprises a single access privilege. For an ACL with multiple access privileges, multiple index entries 970 are generated. Accordingly, FIG. 9 shows the ACL index 97 that is generated from the ACL of FIG. 7a. It is assumed that the ACL of FIG. 7a references the XML document 30 with the identifier "#1" and thus the ACL index 97 comprises "#1" in the index column "document (subject)" 972.

In the example of FIG. 9, each ACL index entry 970 comprises in addition to the user or group identifier 971, the XML document identifier 972 and the privilege 97 a further ACE identifier (ACE ID) 974 which identifies the represented ACE within an ACL. An order is defined on the ACE ID that corresponds to the order of the ACEs in the ACL from which the ACL index 97 is generated. Accordingly, the ACE ID allows for reconstructing the order of the ACE within the originating ACL in order to resolve "conflicting" ACEs. As already explained above, ACEs do not have to be "conflict free", i.e. one ACE may permit a certain operation and a further ACE may deny the same operation. In this case, the ACE ID is used to inspect the individual ACEs in the order defined by the ACE ID and to determine the first matching ACE from the index entry 970 in order to resolve the conflict.

An exemplary XQuery execution plan 70 that uses the ACL index 97 is depicted below:

```
Path [$x: $d/employee] (
    SemiJoin(
        AclIdxScan [$d; userId,read],
        IdxScan [$d; /employee/salary;>;100000]))
```

Accordingly, the AclIdxScan (third line in the above listing) determines the XML documents 30 that can be accessed by the given user 60. To this end, the AclIdxScan reads all the ACEs that are matching the given user-ID (parameter userID) and the given access operation (read in the above listing) and checks the first matching ACE. Based on this ACE, the AclIndexScan decides whether or not the referenced XML document 30 belongs to the result set, i.e. if the user 60 is authorized to retrieve the XML document 30. For each result XML document 30, the subsequent SemiJoin (second line of the above listing) checks if the XML document 30 also belongs to the document set that can be retrieved via the search predicate of the IdxScan (fourth line of the above listing).

The ACL index 97 may be further used to optimize complex XQueries involving Join operations and aggregations. The decision of which of the above-presented variants of an XQuery execution plan 70 should be executed is preferably performed by the optimizer 300 of the XDBMS 10. To this end, the optimizer 300 may use statistics collected on the data, i.e. the XML documents 30, in the XML database 20 as well as statistics on the ACLs stored in the XML database 20.

It will be appreciated that certain embodiments disclosed herein may be carried out, in whole or in part, using one or more computer systems (e.g., XML database management systems). By way of example, the XDBMS, and/or some or all of the components thereof, of certain embodiments may be stored on a computer-readable storage medium and may include or at least interface with software that may be stored on the same or different computer-readable storage medium, or other programmed logic circuitry (e.g., any suitable combination of hardware, software, firmware, and/or the like). In a similar fashion, documents, schemas, etc., may be stored in computer-readable storage mediums or storage areas (such as a memory, disk drive device, CD-ROM, DVD, network storage location, etc.). Executable programmed logic circuitry such as, for example, the optimizers and various engines described herein, also may be stored in and/or run on computer-readable storage mediums or storage areas, e.g., so that they interface with other components so as to produce, for example, data transformations, manipulations, etc., which may sometimes be visualized on a display. Also, "LDAP," "DBMS," and other terminology is indicative of at least a particular defined storage structure and/or paradigm tied to a particular computer system. The computer systems of different embodiments may sometimes be provided in a networked environment.

The invention claimed is:

1. An XML database management system (XDBMS) for an XML database comprising XML documents, the XDBMS including at least one computer, each XML document comprising one or more structural elements and adhering to an XML schema, wherein at least one of the structural elements is protected against access of a user, the XDBMS comprising:

an optimizer configured to process an XQuery of the user comprising one or more XQuery expressions and further configured to generate an optimized XQuery execution plan;

an execution engine configured to execute the optimized XQuery execution plan to retrieve XML data from the XML database, wherein the optimizer is configured to generate the optimized XQuery execution plan, so that all XQuery expressions relating to one or more of the structural elements that are protected against access of the user are ignored by the optimizer.

2. The XDBMS of claim 1, wherein the XDBMS is further configured to determine one or more groups the user belongs to, and wherein at least one of the structural elements is protected against access of the one or more groups.

3. The XDMBS of claim 1, further comprising a pre-processor configured to evaluate at least one structure-based access privilege to determine the XQuery expressions to be ignored by the optimizer, the at least one structure-based access privilege protecting access to the respective structural element for the user and/or the groups.

4. The XDBMS of claim 3, wherein the pre-processor is further configured to derive the at least one structure-based access privilege from type information defined in the XML schema.

5. The XDBMS of claim 3, wherein at least one of the structure-based access privileges is attached to the XML documents comprising the respective structural element, and wherein the execution engine is further configured to evaluate the at least one structure-based access privilege.

6. The XDBMS of claim 5, wherein the execution engine is further configured to scan a structure index.

7. The XDBMS of claim 1, wherein the execution engine is further configured to evaluate one or more instance-based access privileges attached to at least one of the XML documents, the instance-based access privileges protecting access for the user and/or the groups to the respective XML documents.

8. The XDBMS of claim 1, wherein the XDBMS is further configured to generate an access privilege index from the structure-based and/or instance-based access privileges, and wherein the execution engine is configured to scan the access privilege index.

9. The XDBMS of claim 8, wherein the access privilege index comprises one or more index entries each comprising a reference to a user and/or group, a reference to an XML document, an access privilege and/or an identifier.

10. The XDBMS of claim 9, wherein the execution engine is configured to evaluate the first index entry of the access privilege index that matches the user and/or the groups according to an order defined by the identifiers of the index entries.

11. The XDBMS of claim 1, wherein the structure-based and/or instance-based access privileges are defined by Access Control Lists (ACLs).

12. A non-transitory computer readable storage medium tangibly storing a computer program comprising instructions for implementing an XML database management system (XDBMS) of claim 1.

13. A method for processing an XQuery of a user to retrieve XML data from an XML database using an XML database management system (XDMBS), the XML database comprising XML documents, each XML document comprising one or more structural elements and adhering to an XML schema, wherein at least one of the structural elements is protected against access of a user, the XDBMS, the method comprising:

processing, via an optimizer under control of at least one computer, an XQuery of the user comprising one or more XQuery expressions;

generating an optimized XQuery execution plan; and executing the optimized XQuery execution plan to retrieve XML data from the XML database, wherein the optimized XQuery execution plan is generated so that all XQuery expressions relating to one or more of the structural elements that are protected against access of the user are ignored by the optimizer.

14. The method of claim 13, further comprising determining one or more groups the user belongs to, wherein at least one of the structural elements is protected against access of the one or more groups.

15. The method of claim 13, further comprising evaluating at least one structure-based access privilege to determine the XQuery expressions to be ignored by the optimizer, the at least one structure-based access privilege protecting access to the respective structural element for the user and/or the groups.

16. The method of claim 15, further comprising deriving the at least one structure-based access privilege from type information defined in the XML schema.

17. The method of claim 15, wherein at least one of the structure-based access privileges is attached to the XML documents comprising the respective structural element, and further comprising evaluating the at least one structure-based access privilege.

18. The method of claim 17, further comprising scanning a structure index.

19. The method of claim 13, further comprising evaluating one or more instance-based access privileges attached to at least one of the XML documents, the instance-based access privileges protecting access for the user and/or the groups to the respective XML documents.

20. The method of claim 13, further comprising:

generating an access privilege index from the structure-based and/or instance-based access privileges, and scanning the access privilege index.

21. The method of claim 20, wherein the access privilege index comprises one or more index entries each comprising a reference to a user and/or group, a reference to an XML document, an access privilege and/or an identifier.

22. The method of claim 21, further comprising evaluating the first index entry of the access privilege index that matches the user and/or the groups according to an order defined by the identifiers of the index entries.

23. The method of claim 13, wherein the structure-based and/or instance-based access privileges are defined by Access Control Lists (ACLs).

24. A non-transitory computer readable storage medium tangibly storing a computer program comprising instructions for implementing the method of claim 13.

* * * * *